US008996499B2

(12) United States Patent
Kaminsky et al.

(10) Patent No.: US 8,996,499 B2
(45) Date of Patent: *Mar. 31, 2015

(54) USING TEMPORARY PERFORMANCE OBJECTS FOR ENHANCED QUERY PERFORMANCE

(71) Applicant: International Business Machines Corporation, Armonk, NY (US)

(72) Inventors: David L. Kaminsky, Chapel Hill, NC (US); Ramya H. Prasad, Pune (IN); Girish Sundaram, Pune (IN)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 13/720,201

(22) Filed: Dec. 19, 2012

(65) Prior Publication Data

US 2014/0172823 A1 Jun. 19, 2014

(51) Int. Cl.
*G06F 17/30* (2006.01)

(52) U.S. Cl.
CPC .............................. *G06F 17/30442* (2013.01)
USPC .......................................... 707/713; 707/718

(58) Field of Classification Search
CPC ............... G06F 17/30445; G06F 17/30433; G06F 17/30442; G06F 17/30595; G06F 17/30315; G06F 17/30519; G06F 17/30356; G06F 17/30474; G06F 17/30604; G06F 17/30592; G06F 17/30607; G06F 17/30463; G06F 17/30286; G06F 17/30362; G06F 17/30575; G06F 17/30321; G06F 17/30501; G06F 17/30536; G06F 17/30011
USPC ................................................ 707/713, 718
See application file for complete search history.

(56) References Cited

U.S. PATENT DOCUMENTS

| 6,356,889 | B1 | 3/2002 | Lohman et al. |
| 7,080,062 | B1 | 7/2006 | Leung et al. |
| 7,191,174 | B2 | 3/2007 | Day et al. |
| 7,743,052 | B2 | 6/2010 | Bestgen et al. |
| 7,945,557 | B2 * | 5/2011 | Cheng et al. .................. 707/713 |

(Continued)

OTHER PUBLICATIONS

Anonymously, Method and Apparatus of Materialized Table Optimization in SaaS Environment, IPCOM000198079D, Jul. 26, 2010.
IBM, Apparatus, System and Method for query-optimized snapshot views, IPCOM000177502D, Dec. 16, 2008.

(Continued)

*Primary Examiner* — Etienne Leroux
*Assistant Examiner* — Fariborz Khoshnoodi
(74) *Attorney, Agent, or Firm* — Mollborn Patents, Inc.; Fredrik Mollborn (57) ABSTRACT

Methods and apparatus, including computer program products, implementing and using techniques for optimizing query performance in a relational database management system. A query is received at the relational database management system. It is determined whether the query is expected to be a long-running query. In response to determining that the query is expected to be a long-running query, a full table scan is started in order to fetch records needed to satisfy the query from the relational database management system. In parallel with conducting the full table scan, a performance object is built, which is capable of satisfying the query in the relational database management system. In response to completing the construction of the performance object prior to completing the full table scan, the full table scan is stopped and the newly built performance object is used instead to satisfy the query.

14 Claims, 4 Drawing Sheets

(56) References Cited

U.S. PATENT DOCUMENTS

| | | | |
|---|---|---|---|
| 2004/0236727 A1* | 11/2004 | Day et al. | 707/3 |
| 2007/0043697 A1 | 2/2007 | Driesch et al. | |
| 2007/0143246 A1 | 6/2007 | Bestgen et al. | |
| 2008/0147598 A1 | 6/2008 | Nica | |
| 2012/0191698 A1 | 7/2012 | Albrecht et al. | |

OTHER PUBLICATIONS

Yung Hui Lim. 8 Excellent Twitter Analytics Tools to Extract Insights from Twitter Streams. Social Media Today LLC. Posted Mar. 17, 2009. http://socialmediatoday.com/index.php?q=SMC/80437. Downloaded Aug. 2, 2012.

U.S. Appl. No. 14/219,744 Office Action. Notification Date: Aug. 13, 2014.

* cited by examiner

USING TEMPORARY PERFORMANCE OBJECTS FOR ENHANCED QUERY PERFORMANCE

BACKGROUND

The present invention relates to the information management field, and more specifically, to improving processing and optimizing of database queries in a database management system. Databases come in many flavors. One popular form is a relational database management system (RDBMS), such as DB2™ system, which is manufactured by International Business Machines Corporation of Armonk, N.Y.

The RDBMS is responsible for handling all requests for access to the database where the data itself is actually stored, thereby shielding the users from the details of any specific hardware implementation. Using relational techniques, the RDBMS stores, manipulates and retrieves data in the form of table-like relations typically defined by a set of columns or attributes of data types and a set of rows (i.e. records or tuples) of data. The columns may further comprise restrictions on their data content (i.e. valid domains) and may be designated as a primary key or unique identifier for the relation or a foreign key for one or more other relations.

One very common language for dealing with RDBMSs is the Structured Query Language (SQL). SQL includes both data definition operations and data manipulation operations. To maintain data independence a query (i.e. a set of SQL commands) instructs the RDBMS what to do but not how to do it. Thus, the RDBMS includes a query processor for generating various query plans of execution and choosing the least expensive plan with respect to execution costs. Due to the high-level nature of relational expressions and a variety of implementation techniques, automatic query optimization is possible and often necessary to ensure more efficient query processing.

Often, a database application may require the creation of a "view" for the data in given relations or tables. A view provides an alternative way of looking at the data in one or more base tables. It may, for example, contain only selected columns from the table. A materialized query table (MQT) is a table whose definition is based upon the result of a query. The data that is contained in an MQT is derived from one or more tables on which the materialized query table definition is based. One way to think of an MQT is as a kind of materialized view. Both views and MQTs are defined on the basis of a query. The query on which a view is based is run whenever the view is referenced; however, an MQT actually stores the query results as data, and it is possible work with the data that is in the MQT instead of the data that is in the underlying tables.

Materialized query tables can significantly improve the performance of queries, especially complex queries. If the optimizer determines that a query or part of a query could be resolved using an MQT, the query might be rewritten to take advantage of the MQT. Thus, a current dilemma a database query optimizer is faced with regarding query performance is whether to use an existing MQT, or to fetch data directly from the buffer cache (if available) or any other cache/non cache object or perform direct I/O to fetch data from the disks. There are especially no easy solutions if the reporting requirements needs to fetch data from both RDBMS and exogenous unstructured data, such as RSS Feeds, flat files, etc.

Another option is to create a temporary MQT, which can satisfy the query under question. The trade off between the choices of using an existing MQT or temporary MQT may be understood as follows. The existing MQT has no start up time to use it, but using the existing MQT may result in long fetch times because extra I/O's on a table object must typically be performed to determine which records to discard and which to return to the user.

Conversely, the temporary MQT has a start up cost to build, but once built, the fetch time will be faster. The fetch time is faster for a temporary MQT because every record processed in the temporary MQT is one of interest, and thus no time is wasted going to the table object for records that will be discarded immediately. Such decisions need not be made solely based on information internal to the DBMS. External data, such as calendar events, unstructured data (Twitter, Facebook, blogs, etc.) can also be analyzed to predict the likelihood of queries occurring. In a simple example, if weather data indicates the likelihood of a hurricane striking a location, then building stores (e.g., Home Depot) might expect increases in the number of web queries relating to generators available at a particular store sold for less than a given price. The efficiency of answering such queries might be improved by a performance object, such as an MQT. Thus, there is a need for improved mechanisms for processing and optimizing database queries in a database management system.

SUMMARY

According to one embodiment of the present invention, methods and apparatus, including computer program products, are provided for optimizing query performance in a relational database management system. A query is received at the relational database management system. It is determined whether the query is expected to be a long-running query. In response to determining that the query is expected to be a long-running query, a full table scan is started in order to fetch records needed to satisfy the query from the relational database management system. In parallel with conducting the full table scan, a performance object is built, which is capable of satisfying the query in the relational database management system. In response to completing the construction of the performance object prior to completing the full table scan, the full table scan is stopped and the newly built performance object is used instead to satisfy the query.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

The various embodiments of the invention provide techniques for improving processing and optimizing of database queries in a RDBMS by combining data from both the database and from exogenous data sources outside the RDBMS. The various embodiments of the invention will be presented below by way of example with respect to MQT. However, it should be realized that the invention is applicable to any type of performance object that can be used to improve the performance of an incoming query. As was described above, performance issues typically arise in complex data scenarios, which include exogenous data sources like social media, RSS feeds, structured files, etc. in addition to including an RDBMS. Thus, the various embodiments of the invention are especially applicable in such scenarios.

In accordance with one embodiment, a temporary MQT is created after taking into consideration various performance implications. Live switchover to the temporary MQT is then implemented for faster query performance and without any negative effect on the currently running queries and/or applications. When no performance enhancement methods like existing MQT, Indexes, Data cached in memory, etc. exists to improve the query under question, then the system can start creating the temporary MQT, since it is confirmed that it must fetch data from the disk using direct I/O.

A first plan using an existing MQT or data cached in buffer pools or other cache locations is used for processing a query. A temporary MQT index is built for the query simultaneously with the first plan processing the query. When the temporary MQT is built, processing the query with the first plan is stopped and a live switchover to the temporary MQT is provided. Then a second query plan using the temporary MQT is used to continue processing the query at a point where processing stopped with the first query plan.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The various embodiments of the invention will now be described by way of example and with reference to the drawings. In accordance with one embodiment, when it is not clear whether using an existing MQT or cached data or index or any other performance enhancing methods or creating a temporary MQT will provide the greatest query efficiency, the query optimizer starts running the query using the "best of the lot"

access plan, while in the background and in parallel, simultaneously building a temporary MQT for the query. If the query finishes before the temporary MQT is built, the temporary MQT build is terminated. However, when the temporary MQT is built before the query finishes, a live switchover to the temporary MQT will be done and the query will continue at the point it left off at using the existing access plan.

Figure 1:
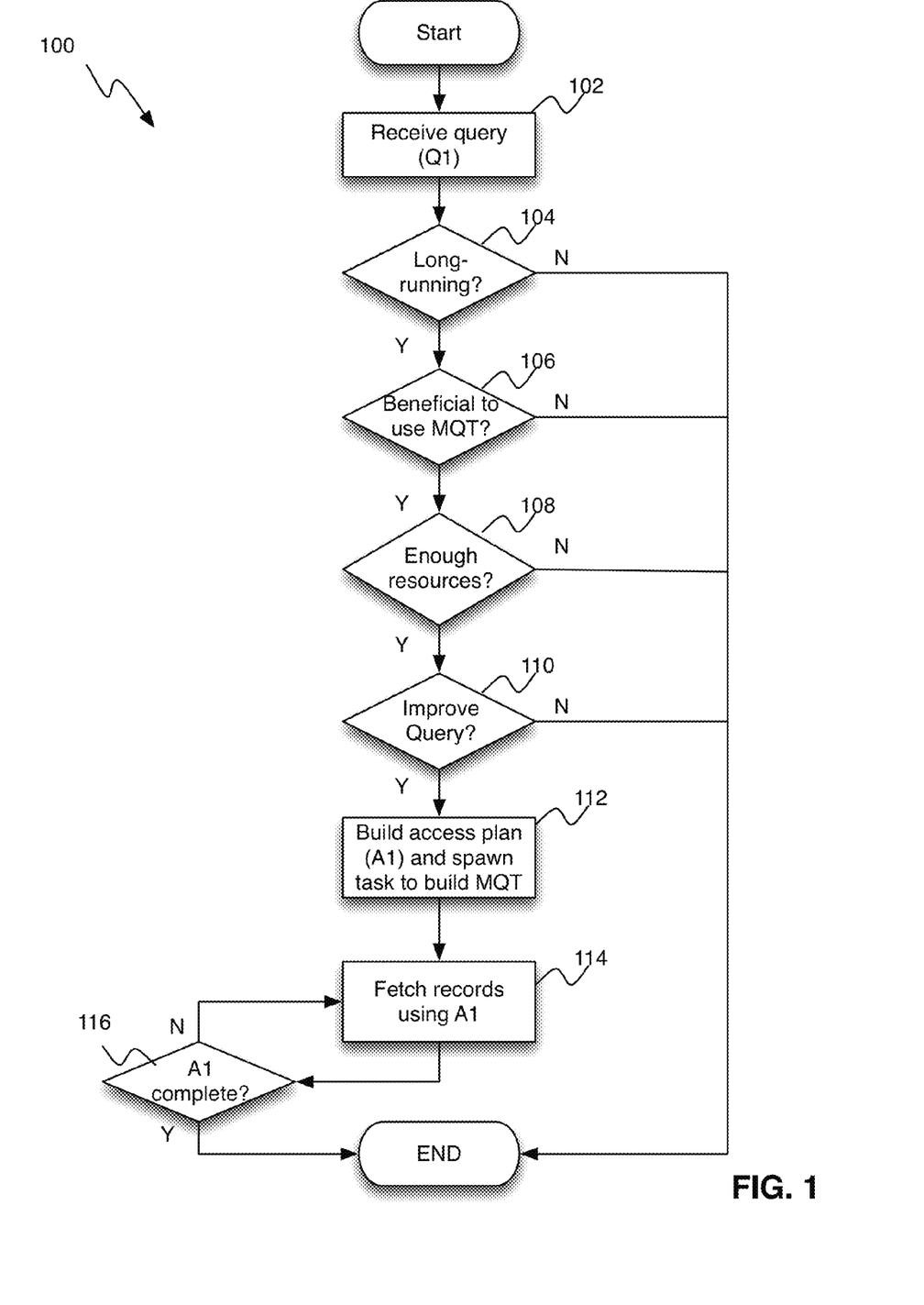
FIG. 1 shows a process (100) for optimizing query performance in accordance with one embodiment.

FIG. 1 shows a process (100) in accordance with one embodiment for optimizing query performance. As can be seen in FIG. 1, the process starts by receiving an incoming Query (Q1) at the RDBMS server (step 102). In some embodiments, the query (Q1) may need to use RDBMS sources, as well as "non-RDBMS sources", also referred to herein as exogenous sources, to satisfy the query (Q1). Thus, it may be necessary to also analyze exogenous data. Mechanisms for performing such analysis are generally known to those of ordinary skill in the art, and will vary depending on the specific type of exogenous source. For example, various methods for analyzing streams on Twitter can be found at http://socialmediatoday.com/index php?q=SMC/80437.

Next, it is determined if the received query (Q1) is projected to be long running (step 104). This can be determined, for example, by comparing the estimated time required to satisfy the query with a threshold value. The threshold can either be user-defined or be set automatically by the system using known techniques for setting threshold values.

If it is determined in step 104 that the query (Q1) is not projected to be long running, then the process ends. If it is determined that the query is projected to be long-running, then the process continues to determine whether the query will be best run with an MQT (step 106). In making this determination, typically both local and exogenous factors are considered. Some examples of local factors include local system resource usage, such as CPU, RAM, I/O, etc. Examples of exogenous factors include network latency accessing a shared file on a shared device, the speed of an Internet connection (e.g., while opening a Facebook account), etc.

If it is determined in step 106 that the query (Q1) will not be best run with an MQT, then the process ends. If it is determined that the query will benefit from being run with an MQT, then the process continues to determine whether the machine on which the query is run has sufficient resources, such as memory, processor speed, etc., to build a temporary MQT without negatively affecting the current running queries or applications (step 108). In one embodiment, the determination can be made using existing RDBMS Optimizers, possibly along with non-RDBMS tools, which have the capability to determine the minimum amount of resources needed to build a performance object. These tools take into consideration the current resource utilization and the resources requirement to create and populate a performance object, such as an MQT.

If it is determined in step 108 that there are not sufficient machine resources, then the process ends. If it is determined that there are enough machine resources, then the process continues to determine whether there are any existing methods for improving the current query (step 110). Some examples of methods that can be used to improve the query include using an existing MQT, caching data in buffer pools, creating indexes, etc.

If it is determined in step 110 that there are no available methods for improving the query, then the process ends. If it is determined that there are methods for improving the query, then the process continues to determine and build an access plan (A1) using the "best of the lot" methods (step 112). In addition, the process spawns a task (T1) to start building alternate performance objects, such as creating a temporary MQT or continuing to populate an existing MQT if one has already been created. This task runs in parallel with the rest of the steps of the process, but will be explained with reference to FIG. 2, in order not to unnecessarily complicate the explanation of the invention.

Next, the process starts fetching the resultant records (R1) as dictated by the query plan (A1) (step 114). The fetching of the records continues until it is determined in step 116 that the query (Q1) is fully executed, at which point the process ends.

Figure 2:
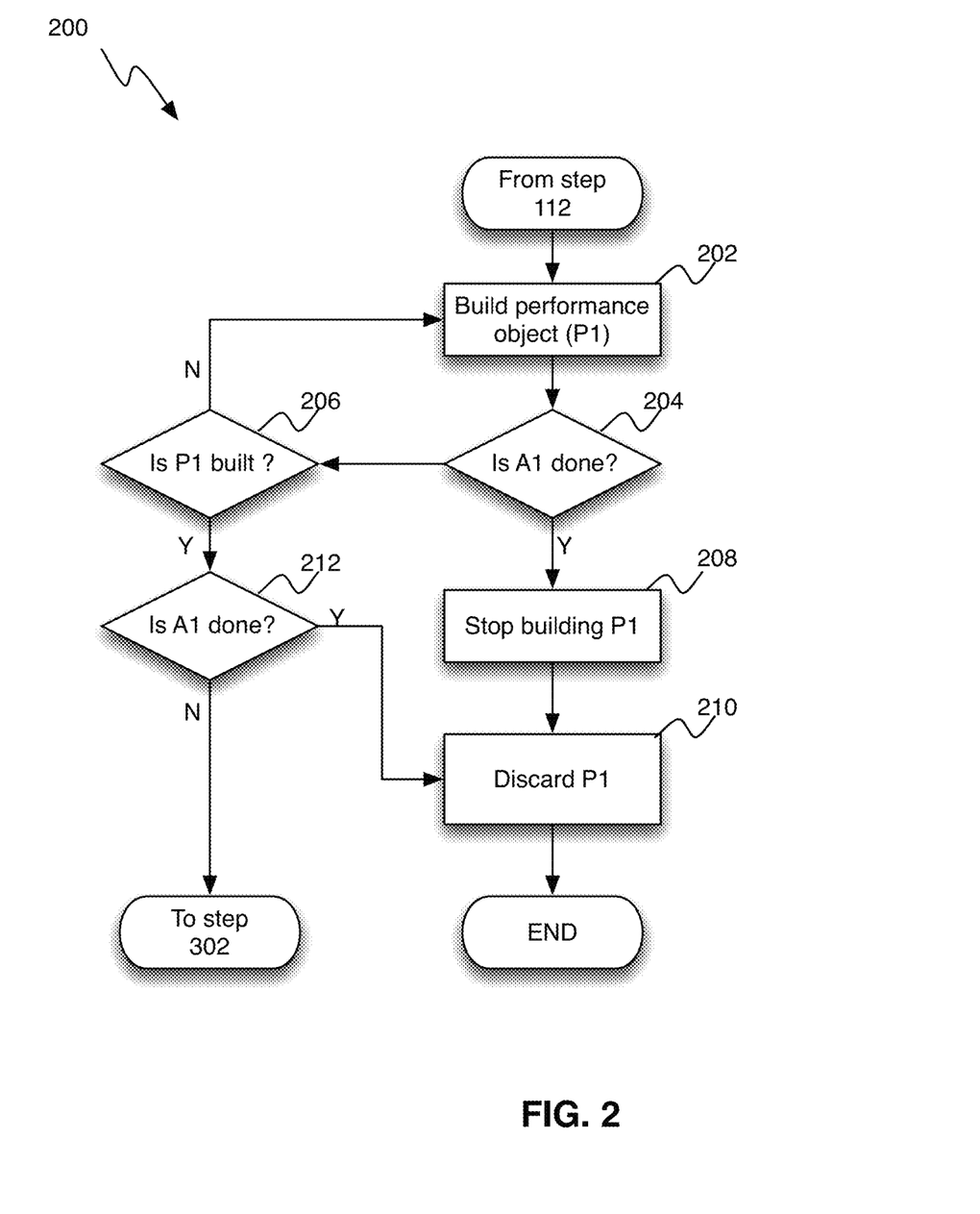
FIG. 2 shows a task (200) for building a performance object, which runs in parallel with at least a portion of the process (100) of FIG. 1, in accordance with one embodiment.

Turning now to the parallel process (200) for building an alternate performance object, shown in FIG. 2, the parallel process (200) starts by building a performance object (P1) (step 202), such as a temporary MQT. The process monitors the execution of the query (Q1) by the query plan (A1) to determine whether the query is done (step 204). If the query is not done, the process checks if the performance object has been completed (step 206). If the performance object has not been completed, then the process returns to step 202 and continues building the performance object.

When it is determined in step 204 that the query is done, then there is no need to continue building the performance object, so the building of the performance object is stopped (step 208) and the performance object is discarded (step 210), which ends the process (200).

Returning now to step 206, if it is determined that the building of the performance object has been completed, the process again checks whether the query has been completed (step 212). If the query is done, then the performance object is discarded (step 210) as it will not be needed, which ends the process (200).

If it is determined in step 212 that the query is still executing in accordance with the query plan (A1), then the execution of the query plan (A1) will stop and the newly built temporary performance object, such as an MQT will be used instead. The details of this will now be described with reference to FIGS. 3 and 4.

Figure 3:
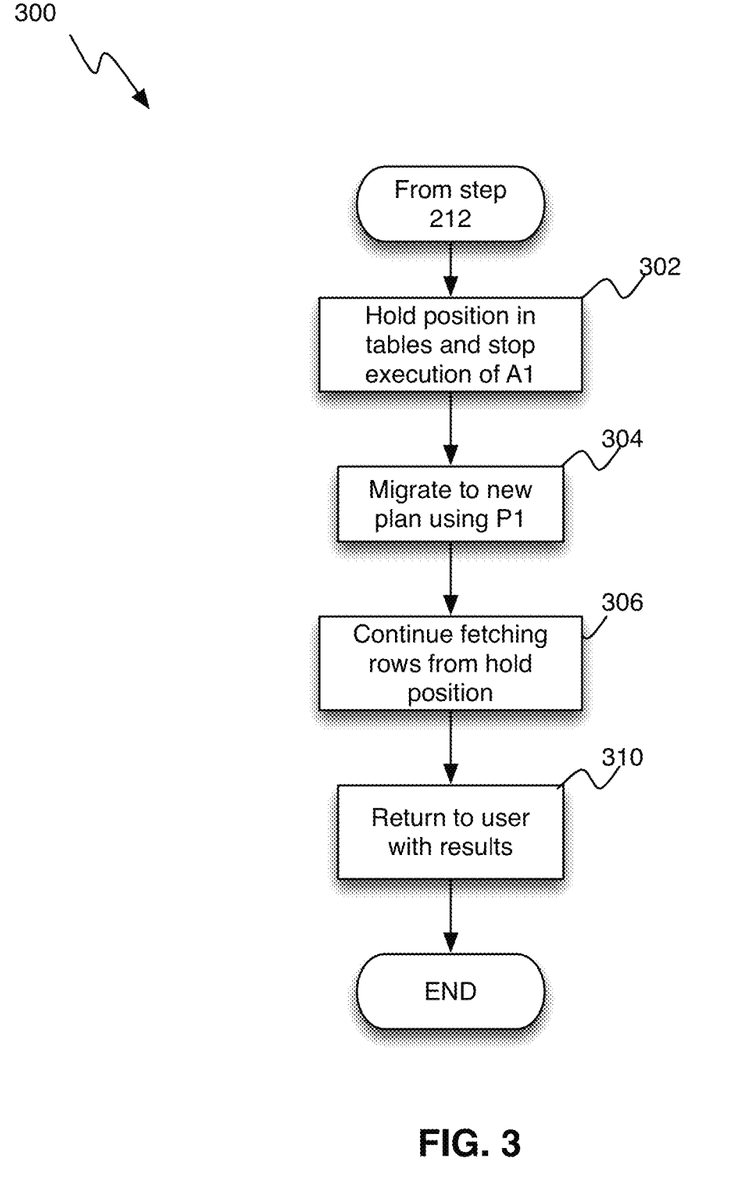
FIG. 3 shows a switchover from an original query plan used by the process (100) to a new query plan based on the performance object, in accordance with one embodiment.

As can be seen in FIG. 3, when the query execution plan (A1) is still running and the performance object has been built, then the execution of the query execution plan is stopped and the position in the tables for the last row fetched is held (step 302). The process then migrates to a new query plan that uses the performance object (P1) (step 304). After migrating to the new query plan, the process continues fetching the remaining records for the query (Q1) using the performance object (i.e., the temporary MQT) (step 306) until the query is satisfied. At that point, the final result is returned to the user (step 308) and the process ends.

In some embodiments, the created performance object can be stored in storage or memory for a certain time, for example, until it exceeds a threshold age value, which can either be set by a user, or by the system using any known techniques, such as a FIFO queue or a data stack.

Figure 4:
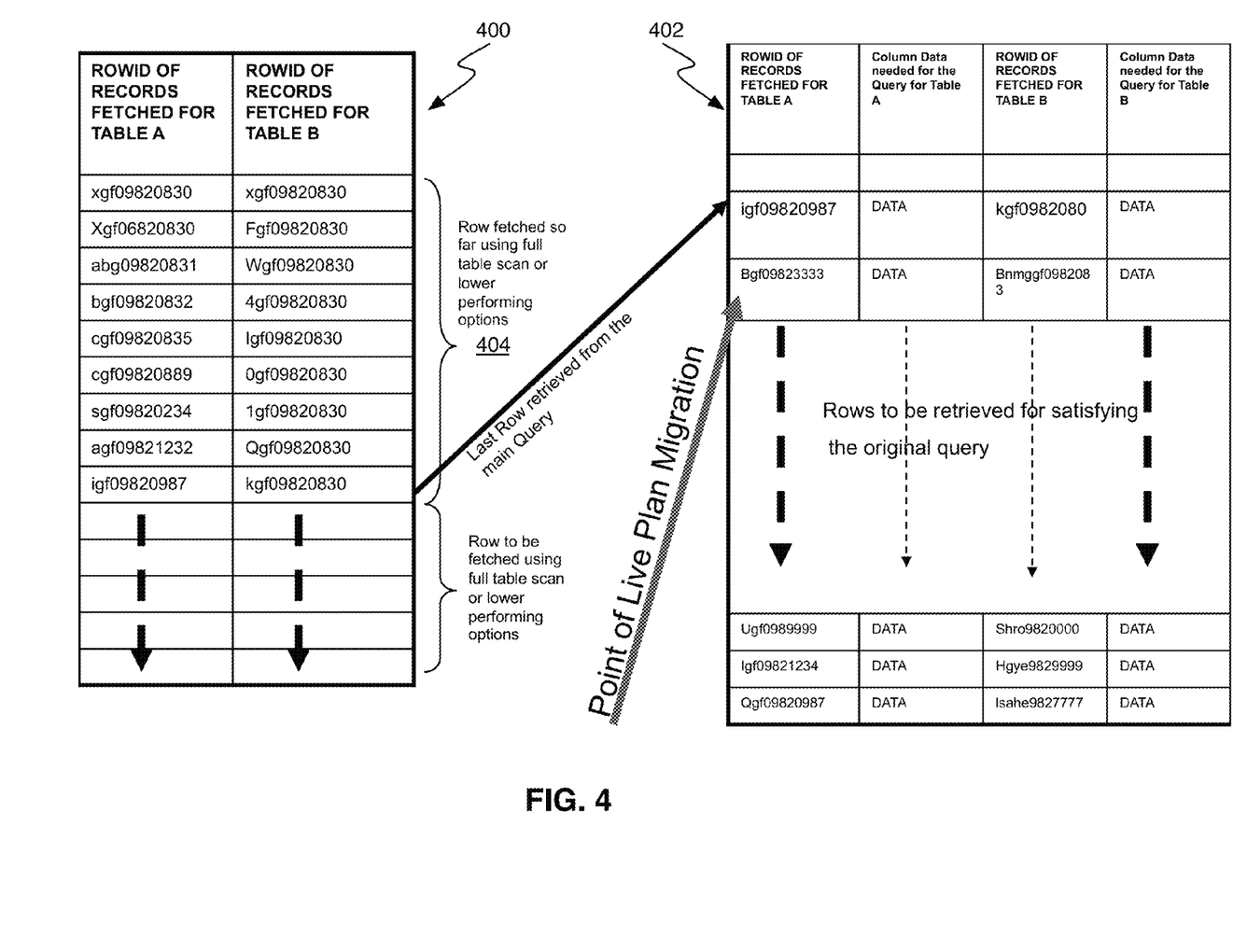
FIG. 4 shows a schematic view of two tables (400, 402) containing RowIDs retrieved to satisfy the query using the original query plan and the performance object, respectively, in accordance with one embodiment.

FIG. 4 shows a schematic example of what the query result tables might look like, in accordance to one embodiment of the invention. The table (400) on the left hand side of FIG. 4 shows a set of RowIDs of records fetched for two tables, Table A and Table B, respectively. The upper section (404) of the table (400) shows the RowIDs that have been fetched using a full table scan or some "lower performing" option, when trying to satisfy the query. The table on the right hand side shows a performance object in the form of an MQT (402), which contains not only the RowIDs for Table A and Table B, but also the column data needed for the query for Table A and Table B, respectively. This MQT (402) is built by the parallel process (200) described above with respect to FIG. 2.

FIG. 4 also shows the point of migration from the old query plan to the new query plan, described above with respect to step 304 of FIG. 3. The last row retrieved from the main query using the old query plan is the one with RowID "igf09820987" for Table A and "kgf09820830" for Table B, as shown in the left hand side table (400). This corresponds to the hold position described above with respect to FIG. 3. The rest of the query is satisfied using the MQT (402), starting at the row having RowID "Bgf09823333" for Table A and "Bnmggf0982083" for Table B, and going through the end of the MQT (402). Retrieving the remaining rows from the MQT (402) is faster compared to having to do a full table scan or another low-performing option from Table A and Table B, respectively.

It should be noted that while the performance object has been discussed above with respect to an MQT, the same general principles can be applied to any type of internal or external database object that might enhance the performance and lead to faster processing of the query. A non-exclusive list of other examples of performance objects includes MDC (i.e., a Multi-dimensional clustered table, which is a DB2 performance object), Indexes, Temporary tables, etc. By having the performance object in memory, the I/O overhead can be reduced, and once the initial investment of creating the performance object has been made, it can often help not only existing queries, but also future ones.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for optimizing query performance in a relational database management system, the computer program product comprising a non-transitory computer readable storage medium having program code embodied therewith, the program code executable by a processor to:
   receive, by the processor, a query at the relational database management system;
   determine, by the processor, whether the query is expected to be a long-running query;
   in response to determining that the query is expected to be a long-running query,
      start, by the processor, a full table scan to fetch records needed to satisfy the query from the relational database management system;
      in parallel with conducting the full table scan, build, by the processor, a performance object capable of satisfying the query in the relational database management system;
   in response to completing the construction of the performance object prior to completing the full table scan, stop, by the processor, the full table scan and use the newly built performance object instead to satisfy the query; and
   store, by the processor, the performance object in one or more of: storage and memory, for a predetermined time period.

2. The computer program product of claim 1, wherein the performance object includes one or more of: a Materialized Query Table, a Multidimensional Clustered Table, an index and a temporary table.

3. The computer program product of claim 1, wherein stopping the full table scan includes:
   stopping the full table scan at a hold position in each table undergoing the full table scan in accordance with a first query plan;
   migrating to a second query plan; and
   locating the corresponding hold position in the performance object;
   continuing the query at the corresponding hold position in the performance object, using a second query plan.

4. The computer program product of claim 1, further comprising program code executable by the processor to:
   prior to starting to build the performance object, determine, by the processor, what type of performance object would be most beneficial, wherein the determination takes into account both local and exogenous factors.

5. The computer program product of claim 1, further comprising program code executable by the processor to:
   in response to completing the full table scan prior to completing the construction of the performance object, stop, by the processor, the construction of the performance object and deleting the performance object from memory.

6. The computer program product of claim 1, wherein determining whether the query is expected to be a long-running query includes:
   examining sources exogenous to the relational database management system, which sources are referenced by the query, to determine whether the query is expected to be long running.

7. The computer program product of claim 1, wherein determining whether the query is expected to be long-running includes:
   estimating a time required to satisfy the query; and
   comparing the estimated time required to satisfy the query to a threshold value representing a time for a query considered to be a long-running query.

8. A system for optimizing query performance in a relational database management system, comprising:
   a processor; and
   a memory containing instructions executable by the processor, the instructions being operable to cause the processor to perform the following operations:
   receiving a query at the relational database management system;
   determining whether the query is expected to be a long-running query;
   in response to determining that the query is expected to be a long-running query,
      starting a full table scan to fetch records needed to satisfy the query from the relational database management system;
      in parallel with conducting the full table scan, building a performance object capable of satisfying the query in the relational database management system;
   in response to completing the construction of the performance object prior to completing the full table scan, stopping the full table scan and using the newly built performance object instead to satisfy the query; and
   storing the performance object in one or more of: storage and memory, for a predetermined time period.

9. The system of claim 8, wherein the performance object includes one or more of: a Materialized Query Table, a Multidimensional Clustered Table, an index and a temporary table.

10. The system of claim 8, wherein stopping the full table scan includes:
    stopping the full table scan at a hold position in each table undergoing the full table scan in accordance with a first query plan;
    migrating to a second query plan; and
    locating the corresponding hold position in the performance object;
    continuing the query at the corresponding hold position in the performance object, using a second query plan.

11. The system of claim 8, wherein the memory further comprises instructions operable to cause the processor to perform the following operation:
    prior to starting to build the performance object, determining what type of performance object would be most beneficial, wherein the determination takes into account both local and exogenous factors.

12. The system of claim 8, wherein the memory further comprises instructions operable to cause the processor to perform the following operation:
    in response to completing the full table scan prior to completing the construction of the performance object, stopping the construction of the performance object and deleting the performance object from memory.

13. The system of claim 8, wherein determining whether the query is expected to be a long-running query includes:
    examining sources exogenous to the relational database management system, which sources are referenced by the query, to determine whether the query is expected to be long running.

14. The system of claim 8, wherein determining whether the query is expected to be long-running includes:
    estimating a time required to satisfy the query; and
    comparing the estimated time required to satisfy the query to a threshold value representing a time for a query considered to be a long-running query.

* * * * *